US 6,633,444 B2

(12) United States Patent
Uno et al.

(10) Patent No.: US 6,633,444 B2
(45) Date of Patent: Oct. 14, 2003

(54) NARROW BAND PARTIAL RESPONSE SIGNAL PROCESSING APPARATUS, SIGNAL PROCESSING METHOD AND INFORMATION STORAGE APPARATUS

(75) Inventors: Hiroshi Uno, Kawasaki (JP); Kiichiro Kasai, Kawasaki (JP); Nobuyoshi Yamasaki, Nagaya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/948,853

(22) Filed: Sep. 7, 2001

(65) Prior Publication Data

US 2002/0101671 A1 Aug. 1, 2002

Related U.S. Application Data

(63) Continuation of application No. PCT/JP99/02823, filed on May 28, 1999.

(51) Int. Cl.$^7$ ............... G11B 5/09; G11B 5/035
(52) U.S. Cl. ............... 360/46; 360/65; 375/232; 375/341
(58) Field of Search ............... 360/39, 46, 65; 375/341, 232

(56) References Cited

U.S. PATENT DOCUMENTS 5,917,863 A * 6/1999 Soichi et al. ............... 375/341
6,122,120 A * 9/2000 Shimoda ............... 360/46
6,219,722 B1 * 4/2001 Tomita ............... 710/14
6,233,714 B1 * 5/2001 Hassner et al. ............... 714/794
6,549,352 B1 * 4/2003 Uno et al. ............... 360/46

FOREIGN PATENT DOCUMENTS

| JP | 63-37789 | 2/1988 |
| JP | 4-177603 | 6/1992 |
| JP | 5-307837 | 11/1993 |
| JP | 6-139699 | 5/1994 |
| JP | 8-7209 | 1/1996 |

* cited by examiner

Primary Examiner—Regina N. Holder
(74) Attorney, Agent, or Firm—Greer, Burns & Crain, Ltd.

(57) ABSTRACT

An information storage apparatus for carrying out a signal processing for a partial response system through a recording medium. A recording unit converts an RZ input code into an NRZI code and records the NRZI code in the recording medium through a write head, thereby giving a (1–D) waveform processing to the RZ input code. An equalizing unit carries out Nyquist equalization for a reproduction code reproduced from the recording medium through a read head based on an equalizing transmission characteristic obtained by dividing a cosine roll-off characteristic setting ¼ of a maximum frequency determined by the RZ input code to be a Nyquist frequency by a transmission characteristic of a magnetic recording and reproducing system. A maximum likelihood detecting section carries out maximum likelihood detection for the code string which is Nyquist equalized by the equalizing section.

9 Claims, 12 Drawing Sheets

NARROW BAND PARTIAL RESPONSE SIGNAL PROCESSING APPARATUS, SIGNAL PROCESSING METHOD AND INFORMATION STORAGE APPARATUS

This is a continuation of International Application No. PCT/JP99/02823, filed May 28, 1999, which was not published in English.

TECHNICAL FIELD

The present invention relates to a signal processing apparatus and method and an information storage apparatus which utilize a partial response, and more particularly to a signal processing apparatus, a signal processing method and an information storage apparatus which carry out waveform equalization by utilizing a partial response subjected to a waveform operation of only (1−D) through a recording system for an input code.

BACKGROUND ART

In recent years, the recording density of a magnetic disk device has been rapidly increased. The increase is mostly caused by an MR head (a magneto-resistance effect head) having a high sensitivity. At the same time, a signal processing greatly depends on the fact that partial response maximum likelihood detection (PRML) which can be reproduced at a low S/N ratio has been practically utilized based on the conventional peak detection. The partial response maximum likelihood detection removes a waveform interference utilizing the partial response and reduces a noise based on a decrease in a band.

More specifically, the partial response maximum likelihood detection serves to carry out Nyquist equalization by using a recording and reproducing system of the magnetic disk device as a partial response system, and a cosine roll-off characteristic has been known as a transmission characteristic of a Nyquist equalizer and ½ of a maximum frequency determined by a code is set to be a Nyquist frequency. A conversion polynomial for a waveform operation of the partial response system is as follows:

$$U(t)=(1-D)\times(1+D)m$$

wherein D represents a delay operator indicative of 1-bit delay and m is a positive integer. A partial response class 4 (PR4) to have m=1 is generally used for the magnetic disk device.

The maximum likelihood detection of the partial response class 4, that is, so-called PR4ML serves to give the following waveform operation to an input code through recording and reproduction for a magnetic disk and to then correct a reproducing error made by a noise or the like through the maximum likelihood detection in accordance with Viterbi algorithm.

$$U(t)=(1-D)\times(1+D)$$

FIG. 1 is a block diagram showing a conventional signal processing apparatus based on the PR4ML. A signal processing apparatus 100 is constituted by a precoder 102, an NRZI recording system 104, a differential detecting section 106, a magnetic reproducing system 108, an equalizer 110, a level detecting circuit 112 and a maximum likelihood detecting circuit 114. For example, an 8/9 RLL code is input as an input code to the precoder 102 to precode 1/(1+D). The NRZI recording system 104 converts an RZ (Return to Zero) code precoded by the precoder 102 into an NRZI (Non-Return to Zero Interleave) code to be recorded on a magnetic disk with a write head through a step-shaped recording current. The differential detecting section 106 reads the magnetic record of the magnetic disk through a read head and detects an impulse waveform to be a differential waveform of the recording signal. The magnetic recording system 108 amplifies a reproduced waveform having the impulse response of the differential detecting section 106. The equalizer 110 carries out Nyquist equalization and equalizes the waveform operation of (1+D) for a reproduced waveform sent from the magnetic reproducing system 108. The level detecting circuit 112 compares the levels of the output waveforms of the equalizer 110 and obtains a level signal having three values of +1, 0 and −1. The maximum likelihood detecting circuit 114 carries out the error correction of a level detected signal in accordance with the Viterbi algorithm. FIG. 2 shows a (1+D) transmission characteristic to be used for the PR4ML, the (1+D) transmission characteristic constitutes a low-pass filter and a noise in a high-frequency region is reduced.

In such a conventional PR4ML, however, the 8/9 RLL code is used. Therefore, if a recording density equivalent to that of a 1/7 RLL code for carrying out peak detection is to be obtained, there is a problem in that a recording frequency becomes higher than the recording frequency of the 1/7 RLL code, a bit shift (NLTS) is generated due to the distortion of a recording current waveform and a non-linear distortion to deteriorate an error rate during reproduction and a circuit becomes complicated.

On the other hand, in the peak detection, there is a problem in that the recording frequency can be lower than that of a PRML by the use of the 1/7 RLL code or the like and data are decided based on the presence of a signal peak in a window, resulting in the difficulty of the implementation of the maximum likelihood detection.

Therefore, the present inventors have proposed a (1−D) partial response signal processing method implementing a maximum likelihood detecting circuit without carrying out the (1+D) waveform operation (Japanese Laid-Open Patent Publication No. 10-328446).

On the other hand, in Japanese Laid-Open Patent Publication No. 6-139699 has proposed a magnetic reproducing apparatus for suppressing an unnecessary high-pass noise component to carry out EPR4 equalization in which a signal to noise ratio on a detecting point is improved. Therefore, a reproducing system is constituted by a low-pass filter having the following frequency characteristic, $$L(w) = \begin{cases} T\{\cos(wt)+1\} & |W| > \frac{\pi}{T} \\ 0 & |W| > \frac{\pi}{T} \end{cases}$$

(T is a bit cycle)
an equalizing filter having the following frequency characteristic, $$E(w) = \frac{1-e^{-jwT}}{H(w)}$$

(T is a bit cycle)
wherein a frequency characteristic obtained from recording to reproduction is represented by H (w), and a Viterbi decoder of the EPR4ML.

While a recording system carries out the (1−D) waveform operation in the magnetic reproducing apparatus proposed in the Japanese Laid-Open Patent Publication No. 10-328446 by the present inventors, the (1−D) waveform operation is carried out by utilizing a differential characteristic in a reproducing system. Thus, there is a problem in that a circuit structure becomes complicated.

DISCLOSURE OF INVENTION

The present invention provides a signal processing apparatus, a signal processing method and an information recording apparatus which implement an improvement in the distortion of a recording current waveform and a reduction in a non-linear shift (NLTS) with a simple structure without increasing a recording frequency for maximum likelihood detection utilizing a partial response.

Moreover, the present invention provides a signal processing apparatus, a signal processing method and an information recording apparatus which implement an improvement in the distortion of a recording current waveform and a reduction in a non-linear shift (NLTS) with a simple structure by lowering a reproducing error rate and enhancing a recording density without increasing a recording frequency for peak detection.

The present invention is characterized by a signal processing apparatus for carrying out a signal processing for a partial response, comprising a code processing unit for performing a (1−D) waveform processing for an input code and an equalizing unit for Nyquist equalizing a code string obtained by the waveform processing in the code processing unit by setting ¼ of a maximum frequency determined by a code to be a Nyquist frequency fn. Moreover, there is provided a maximum likelihood detecting unit for carrying out maximum likelihood detection for the code string which is Nyquist equalized by the equalizing unit. The maximum likelihood detecting unit carries out the maximum likelihood detection of a code based on three values of −1, 0 and +1 of the Nyquist equalization waveform. Furthermore, there is provided a coding unit for converting input data into a code having a lower recording frequency such as a 1/7 RLL code or a 2/7 RLL code to be supplied to the code processing unit.

According to the present invention, thus, the equalized waveform is generated as a narrow-band (1−D) partial response in which the Nyquiest equalization characteristic setting ¼ of the maximum frequency determined by the input code to be the Nyquist frequency fn is changed to a cosine roll-off characteristic over the whole passband. Consequently, recording is carried out with a recording frequency as low as that of peak detection, a non-linear shift (NLTS) to be a bit shift caused by the distortion of a recording current waveform and a non-linear distortion is eliminated such that the maximum likelihood detection can be carried out. Thus, an error rate during reproduction can be enhanced.

Moreover, a peak detecting section for carrying out the peak detection for the code string which is Nyquist equalized by the equalizing unit may be provided. Also for the peak detection, a narrow-band (1−D) partial response is generated, in which the Nyquist equalization characteristic setting ¼ of the maximum frequency determined by the code to be the Nyquist frequency is changed to a cosine roll-off characteristic over the whole passband. Consequently, recording is carried out with a recording frequency as low as that of peak detection, a non-linear shift (NLTS)to be a bit shift caused by the distortion of a recording current waveform and a non-linear distortion is eliminated. Thus, an error rate during reproduction due to the peak detection can be enhanced.

Furthermore, the present invention is characterized by a signal processing method of carrying out a signal processing for a partial response system, comprising a code processing step of performing a (1−D) waveform processing for an input code and an equalizing step of Nyquist equalizing a code string obtained by the waveform processing in the code processing section by setting ¼ of a maximum frequency determined by a code to be a Nyquist frequency fn. Also in this case, moreover, there is provided a maximum likelihood detecting step of carrying out maximum likelihood detection for the code string which is Nyquist equalized at the equalizing step. The maximum likelihood detecting step carries out the maximum likelihood detection of a code based on three values or five values of the Nyquist equalization waveform. Furthermore, there is provided a coding step of converting input data into a code having a lower recording frequency such as a 1/7 RLL code or a 2/7 RLL code to be supplied to the code processing step. Moreover, a peak detecting step of carrying out the peak detection for the code string which is Nyquist equalized at the equalizing step may be provided.

Furthermore, the present invention provides an information storage apparatus for carrying out a signal processing for a partial response system through a recording medium, comprising a recording portion for converting an RZ input code into an NRZI code to be recorded in a recording medium through a write head, thereby giving a (1−D) waveform processing, that is, an operation of $$\{1/(1-D)\} \cdot (1-D)$$

to an RZ input code, and an equalizing section for Nyquist equalizing a reproduction code reproduced from the recording medium through a read head based on an equalization transmission characteristic obtained by dividing, by a transmission characteristic of a magnetic reproducing system, a cosine roll-off characteristic setting ¼ of a maximum frequency determined by an RZ input code to be a Nyquist frequency fn. Moreover, there is provided a maximum likelihood detecting section for carrying out maximum likelihood detection for the reproducing code string which is Nyquist equalized by the equalizing section. The maximum likelihood detecting section carries out the maximum likelihood detection of a code based on three values or five values of the Nyquist equalization waveform. Furthermore, there is provided a coding section for converting input data into a code having a lower recording frequency such as a 1/7 RLL code or a 2/7 RLL code to be supplied to the recording section. Moreover, a peak detecting section for carrying out the peak detection for the reproduction code string which is Nyquist equalized by the equalizing section may be provided.

BRIEF DESCRIPTION OF DRAWINGS

FIGS. 14A to 14J are time charts showing a processing operation according to a twelfth embodiment.

BEST MODE FOR CARRYING OUT THE INVENTION

Figure 1:
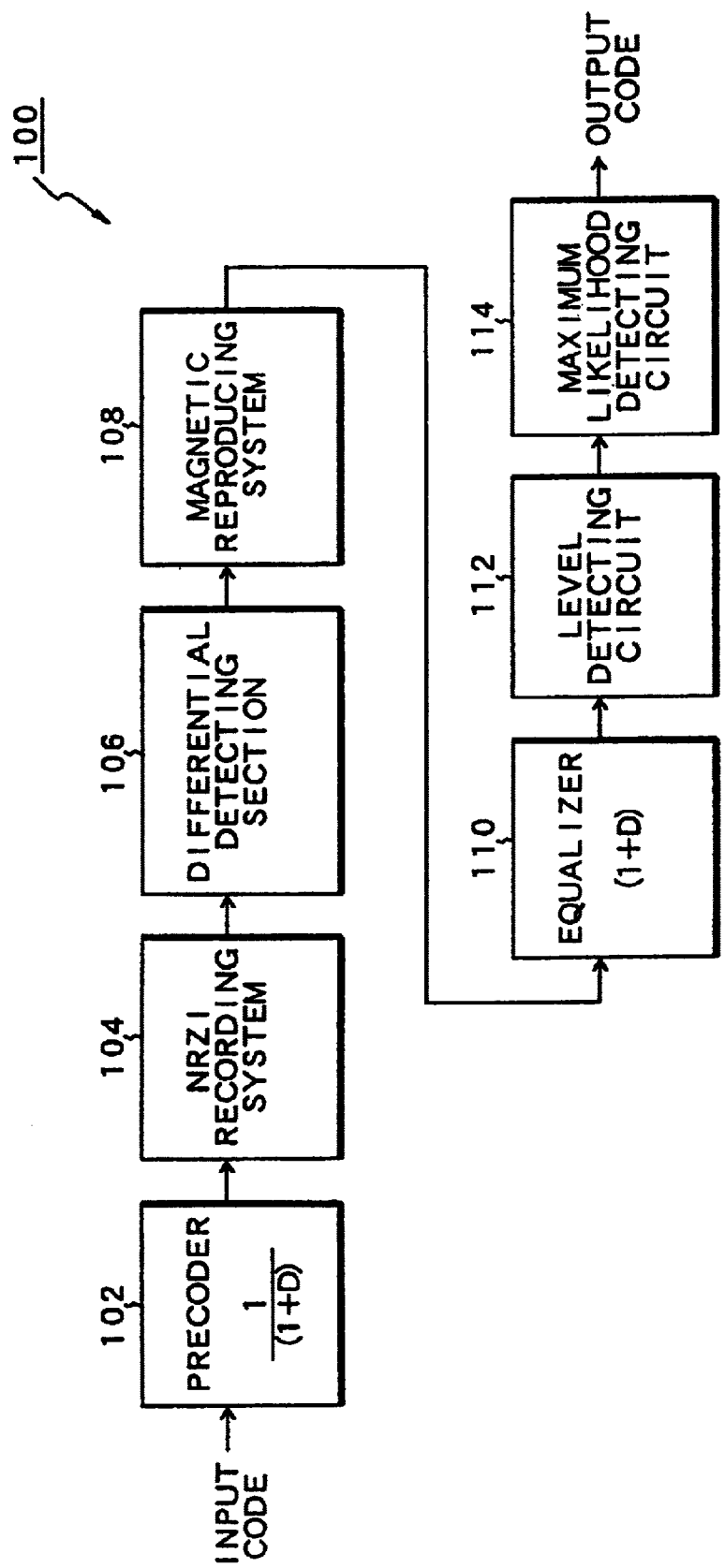
FIG. 1 is a block diagram showing a conventional apparatus for carrying out partial response maximum likelihood detection.
Figure 2:
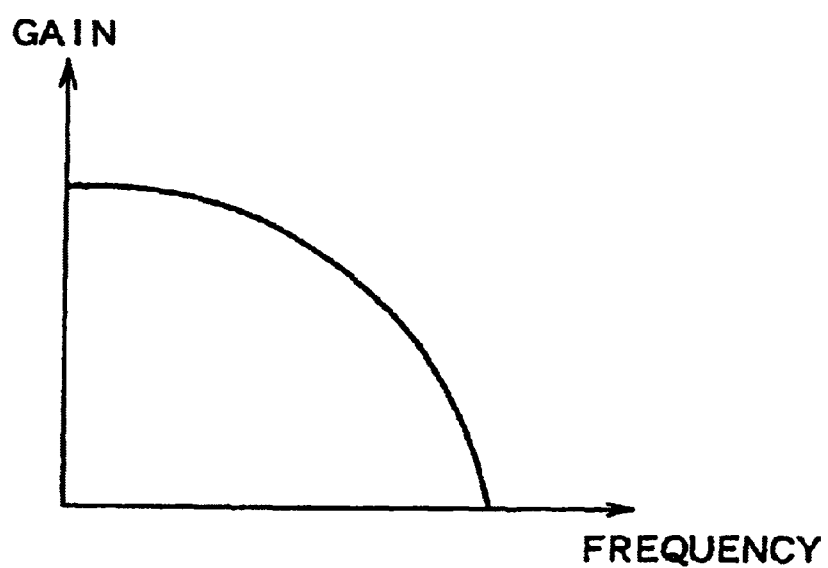
FIG. 2 is a (1+D) transmission characteristic chart in the conventional apparatus in FIG. 1.
Figure 3:
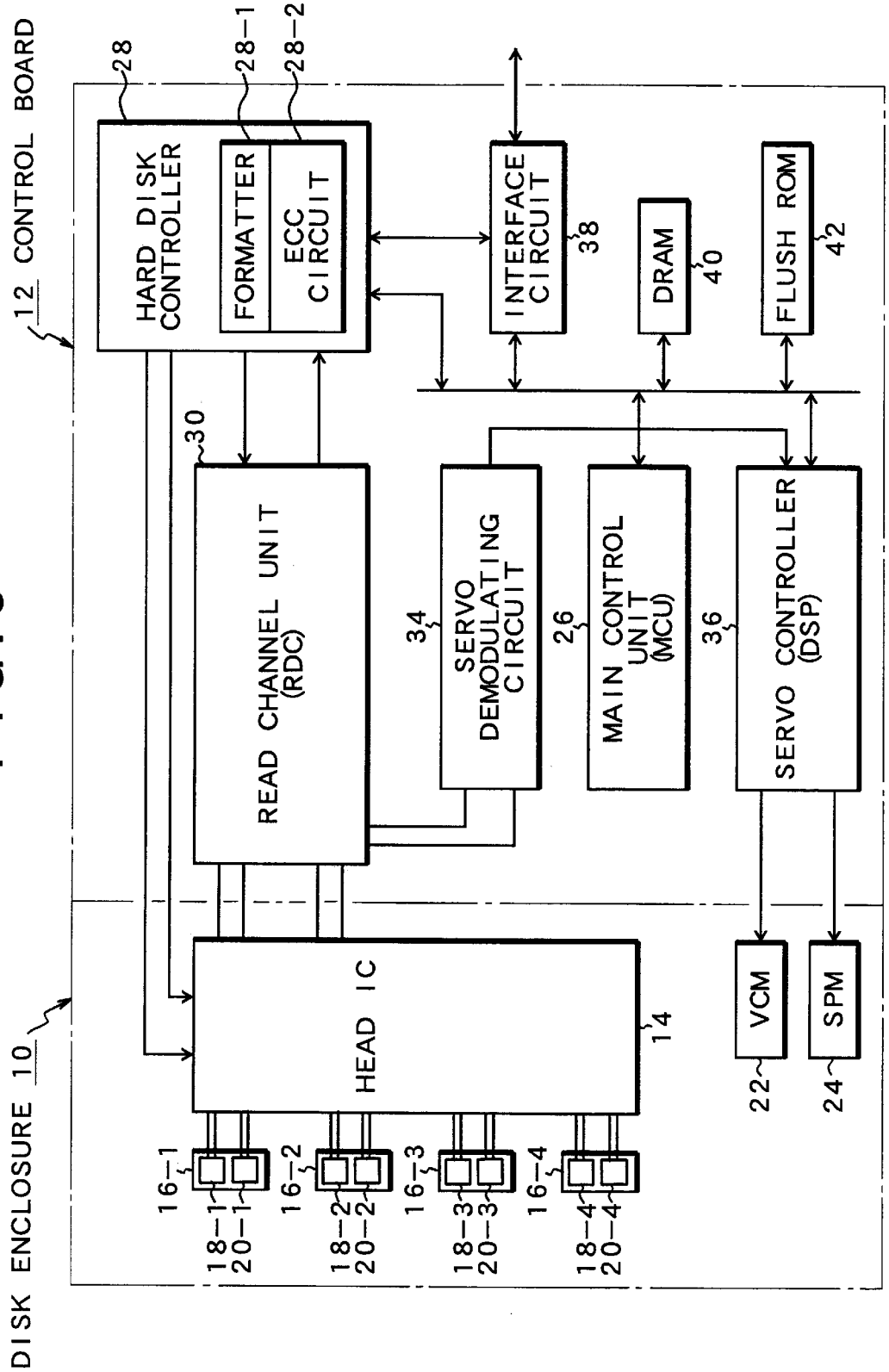
FIG. 3 is a block diagram showing a hard disk drive to which the present invention is applied.

FIG. 3 is a block diagram showing a hard disk drive to which the present invention is applied. A hard disk drive (HDD) which is well known as a magnetic disk device is constituted by a disk enclosure 10 and a control board 12. The disk enclosure 10 is provided with a head IC 14, and is connected to four head assemblies 16-1 to 16-4 in the present embodiment. The head assemblies 16-1 to 16-4 are provided with recording heads 18-1 to 18-4 using an inductive head and reproducing heads 20-1 to 20-4 using an MR head or the like. Moreover, the disk enclosure 10 is provided with a VCM 22 for driving a head actuator and a spindle motor 24 for rotating a disk medium.

A read channel unit (RDC) 30 including a recording system and a reproducing system for the disk medium is provided on the control board 12 side for the head IC 14 of the disk enclosure 10. A hard disk controller (HDC) 28 is provided for the read channel unit 30, and a formatter 28-1, an ECC circuit 28-2 and the like are provided in the hard disk controller 28. The hard disk controller 28 is connected to an interface circuit 38 and serves to supply write data from a host and to transfer read data to the host through data transmission on the high order host side.

The whole control of the hard disk drive is carried out by a main control unit (MCU) 26. The main control unit 26 connects the hard disk controller 28 and the interface circuit 38 through a bus, and receives and decodes various commands from a host and designates read/write for the hard disk controller 28 and carries out head positioning control through the driving operation of the VCM 22 provided in the disk enclosure 10. Moreover, a DRAM 40 and a flash ROM 42 are connected to the main control unit 26 through a bus. The DRAM 40 is used as a work memory necessary for various control operations of a transfer buffer of the interface circuit 38 and a hard disk drive. For the head positioning control through the driving operation of the VCM 22, a servo demodulating circuit 34 and a servo controller 36 are provided. In the present embodiment, servo information employs a data face servo. Accordingly, the servo information is separated from a reproducing signal to be sent to a read channel unit 30 and head position information is demodulated through the servo demodulating circuit 34.

Figure 4:
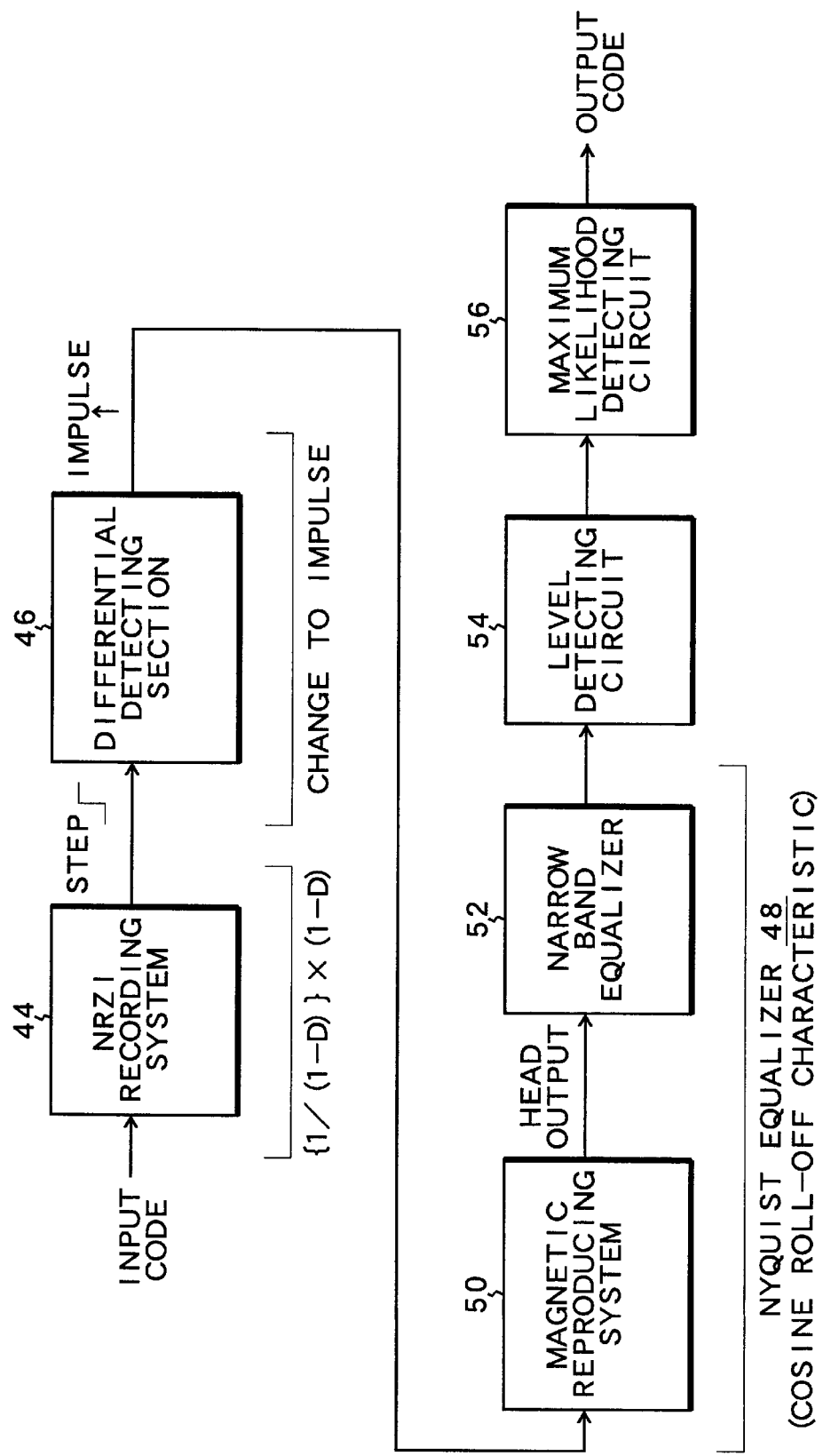
FIG. 4 is a block diagram showing a signal processing apparatus for carrying out (1−D) partial response maximum likelihood detection according to the present invention.

FIG. 4 shows the basic structure of a narrow band (1–D) partial response signal processing according to the present invention applied to the hard disk drive in FIG. 3, the signal processing carries out maximum likelihood detection and can be a so-called narrow band (1–D) PRML signal processing. The signal processing apparatus shown in FIG. 4 is constituted by an NRZI recording system 44, a differential detecting section 46, a magnetic reproducing system 50, a narrow band equalizer 52, a level detector 54 and a maximum likelihood detecting circuit 56, and the magnetic reproducing system 50 and the narrow band equalizer 52 constitute a Nyquist equalizer 48. The NRZI recording system 44 serves to record an input code in a step-shaped medium, thereby carrying out precoding of $1/(1-D)$ and an operation of $(1-D)$ at the same time. By differentially detecting the result thus recorded in the medium through a head in the differential detecting section 46, the code is impulsed. The head implementing the differential detecting section 46 is an inductive head and can differentially detect the result of record of the medium by detecting a vertical component of a magnetic flux through an MR head in the same manner. The magnetic reproducing system 50 reproduces, as a head output, an impulse response waveform of a transmission characteristic H1 determined by a frequency characteristic of the medium and the head. A product of the transmission characteristic H1 of the magnetic reproducing system 50 and a transmission characteristic H2 of the narrow band equalizer 52 is a transmission characteristic H0 of the Nyquist equalizer 48. In other words, H0=H1×H2 is obtained.

Figure 5:
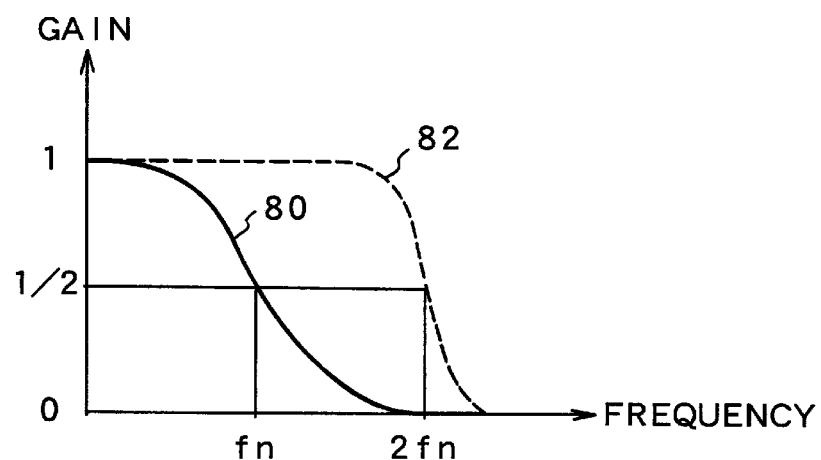
FIG. 5 is a transmission characteristic chart for a (1−D) partial response system according to the present invention, in which a band is restricted by using a whole passband as a cosine roll-off characteristic.

FIG. 5 shows a transmission characteristic H0 of the Nyquist equalizer 48 in FIG. 4. A characteristic shown in a solid line 80 indicates the transmission characteristic H0 of the narrow band (1–D) partial response through the Nyquist equalizer 48 according to the present invention shown in FIG. 4. Moreover, a characteristic 82 indicates a transmission characteristic for the (1–D) partial response signal processing in which band restriction is not carried out. In the transmission characteristic H0 in the narrow band (1–D) partial response according to the present invention shown in the solid line 80, Nyquist fn having a gain of ½ is ½ of that in the case in which there is no band restriction shown in a broken line 82. Consequently, the cosine roll-off characteristic is set over the whole passband. More specifically, the roll-off of the Nyquist equalizer 48 is set to a cosine waveform to obtain a gain of 1 with a frequency of 0, a gain of ½ with a frequency of fn and a gain of 0 with a frequency of 2 fn. The frequency fn is a Nyquist frequency and is set to be ¼ of a maximum recording frequency determined by an input code. This is expressed as follows.

$$G(f) = \begin{cases} 1 & \left(0 \le f \le \frac{1-k_0}{2}\right) \\ \cos^2 \frac{\pi}{2k_0}\left(f - \frac{1-k_0}{2}\right) & \left(\frac{1-k_0}{2} \le f \le \frac{1+k_0}{2}\right) \\ 0 & \left(\frac{1+k0}{2} \le f\right) \end{cases} \quad (1)$$

wherein $k_0=1$ is set, $$G(f) = \cos^2 \frac{\pi}{2} f \quad (2)$$

which can be expressed as follows;

$$G(f) = \frac{1}{2} + \frac{1}{2}\cos\pi \times f \quad (3)$$

and can also be expressed as follows.

$$G(f) = \frac{1}{2} - \frac{1}{2}\sin\pi \times \left(f - \frac{1}{2}\right) \quad (4)$$

It is apparent that the transmission characteristic of the narrow band (1–D) partial response according to the present invention shown in the solid line 80 of FIG. 5 has a smaller band than that of a transmission characteristic shown in the broken line 82 having no band restriction and a gain of a high frequency is greatly reduced. An impulse response waveform of the Nyquist equalizer 48 is shown in a solid line of FIG. 6. The impulse response waveform in FIG. 6 has an amplitude of "0" with a time ±nT (n is an integer and T=½ fn) and an amplitude of "2" with a time of 0. Furthermore, an amplitude of "0" is obtained with an intermediate time ±(0.5+n)T. Consequently, the Nyquist frequency fn can be set to ½ of that in the case in which there is no band restriction.

Figure 6:
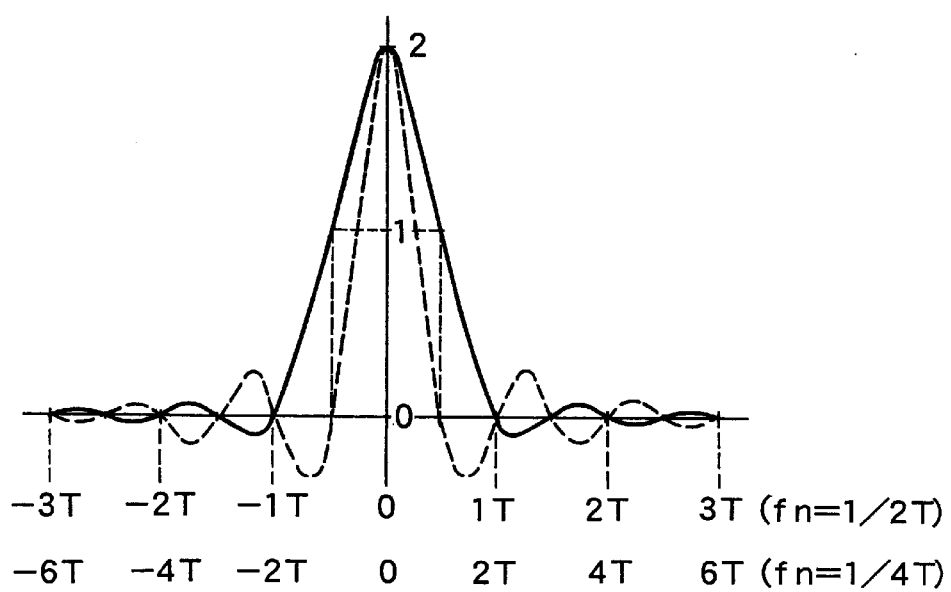
FIG. 6 is a chart illustrating an impulse response waveform of the (1–D) partial response system in FIG. 4.

A lower column of an axis of abscissa in FIG. 6 shows the case of =¼ fn. A broken line in FIG. 6 indicates an impulse response waveform in the Nyquist equalizer in the case in which band restriction is not carried out and the Nyquist frequency is set to ½ of a maximum recording frequency and indicates a doubled amplitude. By comparing both of them, it is apparent that the present invention requires a smaller high frequency component to greatly equalize a pulse width.

In the impulse response waveform according to the present invention, moreover, an amplitude of "1" with a time of ±0.5T becomes a problem which can be solved by the selection of a code. More specifically, (1–D) is calculated through the NRZI recording system 44 in FIG. 4. Therefore, the impulse response waveform output from the Nyquist equalizer 48 is changed to be alternately positive and negative. Consequently, if there is at least one "0" between the alternate positive and negative waveforms, an interference with the amplitude of "2" can be removed. As a result, a partial response equalization waveform to have amplitudes of 2, 1, 0, –1 and –2 in a predetermined time as shown in FIG. 5 is output to the output of the narrow band equalizer 52.

The level detecting circuit 54 shown in FIG. 4 discriminates five values (2, 1, 0, –1, –2) of the partial response equalization waveform output from the narrow band equalizer 52. The maximum likelihood detecting circuit 56 corrects an error by maximum likelihood detection by utilizing the fact that data appear to be alternately positive and negative and a higher level is correct, outputs only an amplitude corresponding to ±2 discriminated by the level detecting circuit 54 as a code of "1" and outputs an amplitude corresponding to 0 and ±1 as a code of "0". Description will be given to the embodiment of the hard disc drive in FIG. 3 based on the principle of the narrow band (1–D) partial response signal processing according to the present invention shown in FIG. 4.

Figure 7:
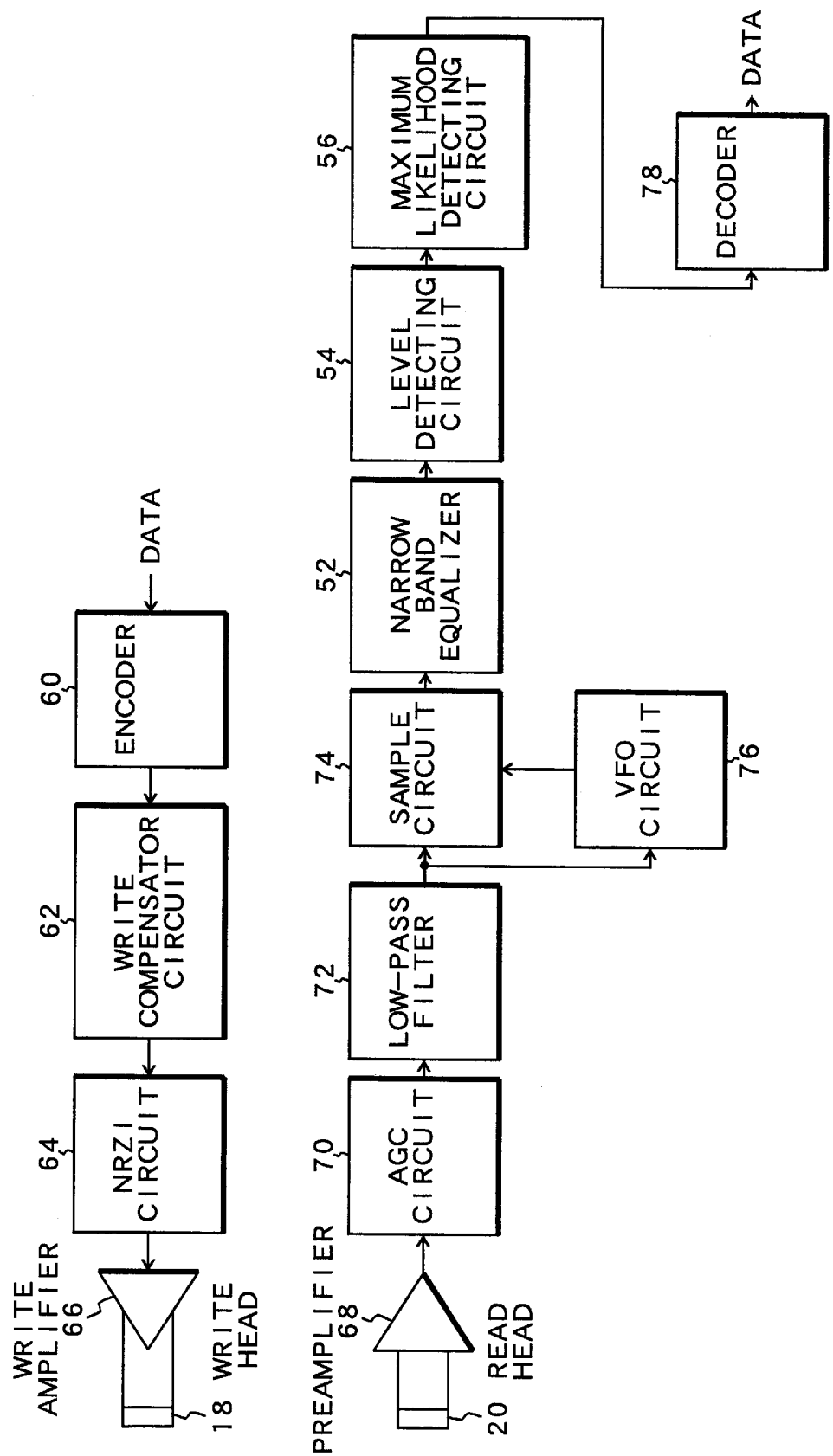
FIG. 7 is a block diagram showing the case in which the (1–D) partial response maximum likelihood detection according to the present invention is applied to a read channel unit of the hard disk drive in FIG. 3.

FIG. 7 shows a portion corresponding to the read channel unit 30 of the control board 12 and the head IC 14 of the disk enclosure 10 in the hard disk drive in FIG. 3. In FIG. 7, a recording system is constituted by an encoder 60, a write compensation circuit 62, an NRZI circuit 64, a write amplifier 64 and a write head 18. Moreover, a reproducing system is constituted by a read head 20, a preamplifier 68, an AGC circuit 70, a low-pass filter 72, a sample circuit 74, a VFO circuit 76, a narrow band equalizer 52, a level detecting circuit 54, a maximum likelihood detecting circuit 56 and a decoder 58. Input data are converted into the 1/7 RLL code through the encoder 60 and the number of continuous "0"s is 1 at a minimum and 7 at a maximum. The write compensation circuit 62 previously moves a recording value slightly in order to compensate for a non-linear shift (NLTS). The following Table 1 indicates a compensation algorithm.

TABLE 1

|  | n – 1 | n |
|---|---|---|
| Backward shift (Late) | 1 | 1 |
| Normal position (Non) | 0 | 1 |

Figure 8:
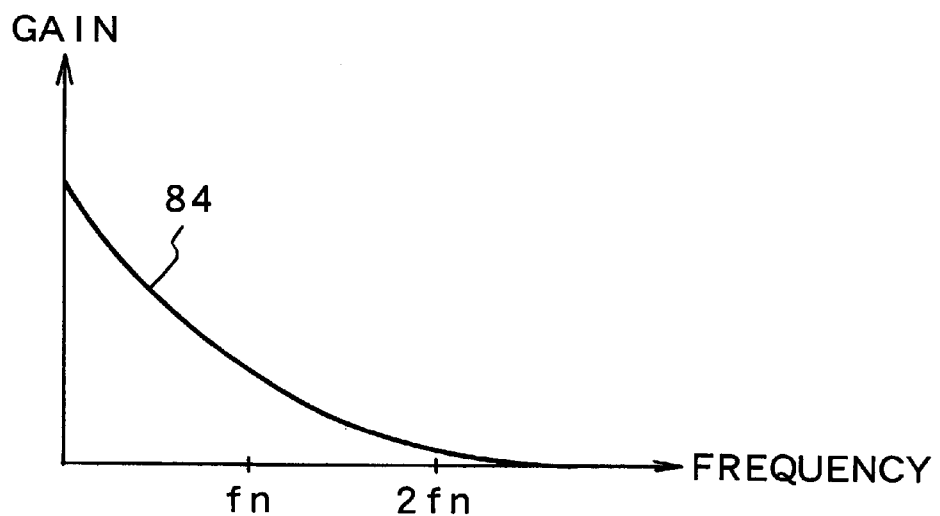
FIG. 8 is a transmission characteristic chart for a magnetic recording system in FIG. 7.

In the Table 1, when a last bit (n–1) is 1, a current bit "n" is shifted (Late) backward by a time of Δ τ. When the last bit (n–1) is 0, the current bit is recorded in a normal position (Non). A compensation algorithm serves to compensate for a non-linear shift phenomenon (NLTS) in which next magnetized inversion is shifted forward by the influence of previous magnetized inversion by 1 bit. Moreover, in the case in which there is an influence of the previous magnetized inversion by 2 bits or more, it can also be compensated. In this case, a compensation amount Δτ is sequentially reduced. In the narrow band (1–D) partial response signal processing according to the present invention, moreover, a recording frequency is lower than that of the conventional partial response maximum likelihood detection, for example, the PR4ML. Therefore, the amount of the non-linear shift (NLTS) is small. For this reason, it is also possible to omit write compensation to be carried out by the write compensation circuit 62. The NRZI circuit 64 is constituted by one flip-flop stage and serves to convert an RZ code (Return to Zero code) to an NRZI code (Non-Return-to Zero Interleave code) and an operation of {1/(1–D)}·{1–D} is carried out equivalently. The NRZI code sent from the NRZI circuit 64 drives the write head 18 as a recording current corresponding to data in the write amplifier 66 and is recorded in a medium which is not shown. The read head 20 has a differential characteristic for detecting a change in magnetization of the medium. Consequently, data recorded in the medium like a step are differentiated by the reading operation of the read head 20 and are changed into an impulse. At the same time, the medium and the read head 20 have the transmission characteristic H1 corresponding to the frequency characteristic of the medium and the transmission characteristic H1 has been known as the Lorentz approximation. FIG. 8 shows the transmission characteristic H1 of the head and the medium system. In FIG. 8, a frequency fn is a Nyquist frequency in the narrow band (1–D) partial response according to the present invention and 2 fn is a Nyquist frequency obtained when band restriction is not carried out. Returning to FIG. 7, the AGC circuit 70 causes the amplitude of a read waveform output from the preamplifier 68 to be constant and removes an unnecessary noise through the low-pass filter 72. The low-pass filter 72 can also act as a part of the narrow band equalizer 52 in a latter stage. The sample circuit 74 sample-holds a reproducing signal through a clock sent from the VFO circuit or digitizes the reproducing signal through an AD converter.

Figure 9:
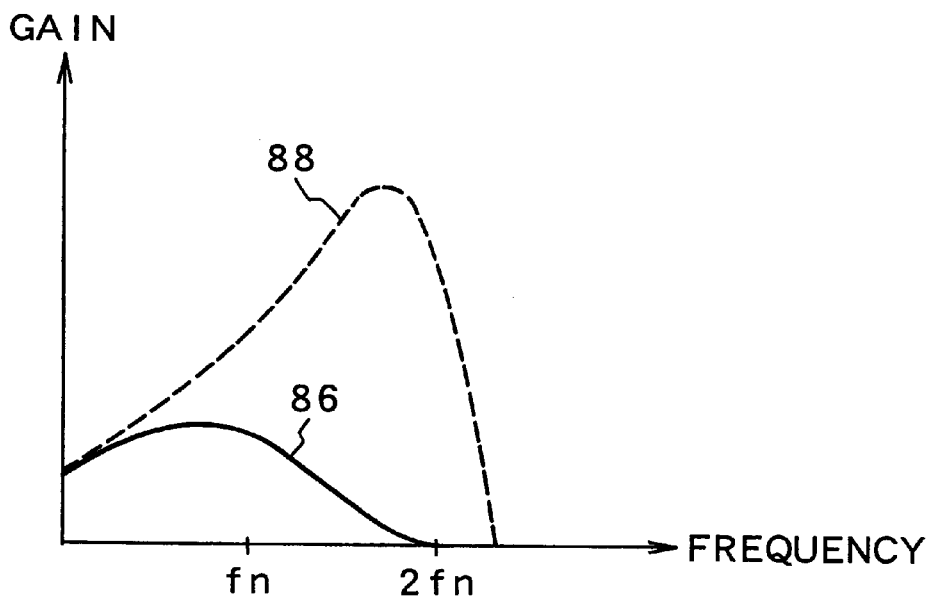
FIG. 9 is a transmission characteristic chart showing a narrow band equalizer in FIG. 8.

The frequency of the clock sent from the VFO 76 is identical to the maximum recording frequency determined by the 1/7 RLL code. Therefore, the Nyquist frequency fn is ¼ of the maximum recording frequency determined by the 1/7 RLL code. According to the sampling theorem, reproduction can be carried out till a frequency band which is half of the sampling clock. Moreover, a signal in a frequency band having ½ of a frequency or more of the sampling clock might become a noise to influence a reproducing band. In order to solve the problem, the clock frequency of the sample circuit 74 is high and may be doubled to 2 fn, for example. The narrow band equalizer 52 serves to equalize a transmission characteristic after the read head 20 to a cosine roll-off characteristic and a transmission characteristic H2 shown in FIG. 9 is obtained. The transmission characteristic H2 of the narrow band equalizer 52 is obtained by dividing the cosine roll-off characteristic H0 in FIG. 5 by the transmission characteristic H1 of a head medium system in FIG. 8. In other words, H2=H0/H1 is obtained. A characteristic 86 shown in a solid line of FIG. 9 is a characteristic according to the present invention which is obtained by the narrow band equalizer 52 in FIG. 7, and a characteristic shown in a broken line 88 is obtained when a band is not restricted. According to the characteristic of the narrow band equalizer 52 shown in the solid line 86 according to the present invention, it is apparent that the gain of a high frequency is reduced greatly. In consideration of the fact that a noise spectral generated from the medium is great with a high frequency, S/N can be enhanced greatly. The narrow band equalizer 52 is constituted by a transversal filter or the like and can also be of an adaptive type for automatic regulation according to a reproducing signal.

The VFO circuit 76 serves to generate a clock signal synchronously with the reproducing signal to compare a phase on a peak point of the output of the low-pass filter 72 with the phase of a clock such that a phase difference is 0. The level detecting circuit 52 serves to discriminate five values of +2, +1, 0, −1 and −2 in the amplitude for the partial response equalization waveform output from the narrow band equalizer 52 and is constituted by a voltage comparator. The maximum likelihood detecting circuit 56 is constituted by a path memory for storing a candidate path and a deciding circuit for deciding a correct path by inverting data alternately to be positive and negative, and outputs only an amplitude corresponding to ±2 as a code of "1" and outputs an amplitude corresponding to 0 and ±1 as "0". The decoder 58 converts the 1/7 RLL code into data on an original NR code and outputs demodulation data.

Figure 10:
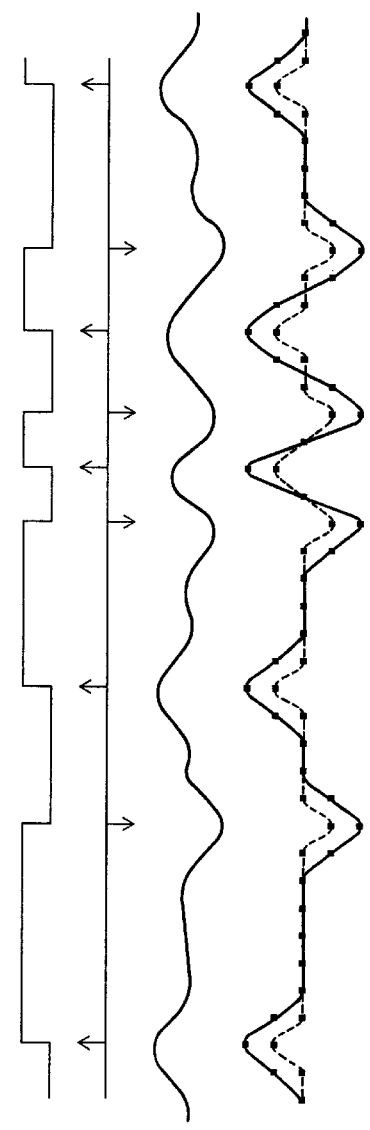
FIGS. 10A to 10M are time charts showing a processing operation according to a seventh embodiment.
Figure 11:
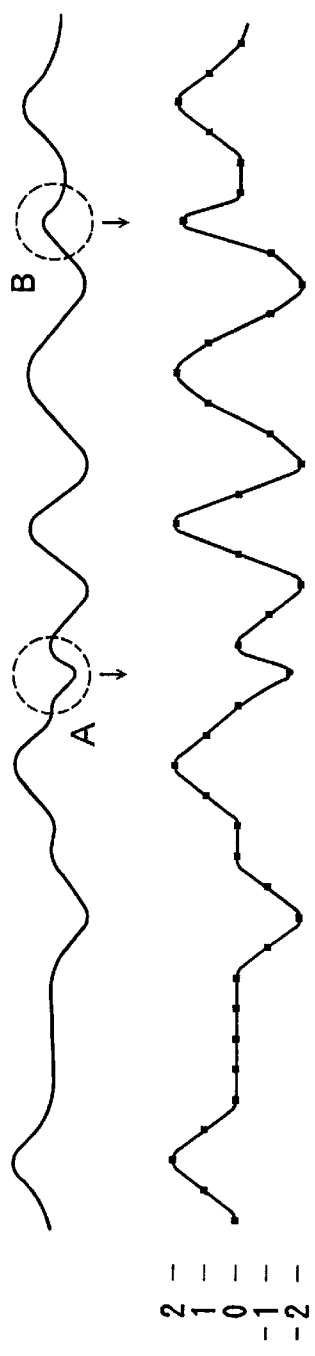
FIGS. 11A to 11F are time charts showing a correcting operation based on maximum likelihood detection when an error is made by a noise.

The embodiment of FIG. 7 will be described in more detail with reference to time charts of FIGS. 10A to 10M. Data input in FIG. 10A are converted into a 3-bit 1/7 RLL code every two bits to be an input code shown in FIG. 10B. An operation of I/(I−D) shown in FIG. 10C is equivalent to an exclusive OR of the input code in FIG. 10B and last data on the result of the operation of 1/(1−D). An operation of (1−D) in FIG. 10D is equivalent to a subtraction of the result of the operation of 1/(1−D) in FIG. 10C with one delay. The operations of 1/(1−D) and (1−D) in FIGS. 10C and 10D are equivalently executed in one flip-flop stage of the NRZI circuit 64. The write amplifier 66 drives the write head 18 such that the direction of the recording current in FIG. 10E is inverted with codes of 1 and −1. A reading output of the read head 20 is changed into an impulse by the differential detecting function of the read head 20 as shown in FIG. 10F and an impulse response waveform shown in FIG. 10G is output from the head based on the transmission characteristic of the medium head. The narrow band equalizer 52 is constituted by a 10-tap transversal FIR filter, for example, and is set to have such a transmission characteristic as to obtain the Nyquist equalization waveform shown in the solid line of FIG. 6. More specifically, a voltage on a sample point of the output of the narrow band equalizer 52 repetitively corrects each tap gain according to a shift from five values of ±2, ±1 and 0 so that a target transmission characteristic can be set. An equalizer of an application type has such a function and an application method has been known as a maximum inclination method. As a result, the transmission characteristic after the read head 20 is the cosine roll-off characteristic in FIG. 5 and the narrow band equalizer 52 equalizes a sample point in FIG. IOH to a partial response waveform which is Nyquist equalized in a solid line with a dotted voltage of +2, +1, 0, −1 and −2 and outputs the partial response waveform. The level detecting circuit 52 discriminates the voltages of +2, +1, 0, −1 and −2 on the sample points of the partial response waveform output from the narrow band equalizer 52 as shown in FIG. IOI and outputs amplitudes +2, −2 and 0 or ±1 as codes "1", "−1" and "0" respectively as shown FIG. 10J. A broken line in FIG. 10H indicates a partial response waveform obtained when the Nyquist frequency is ½ of the maximum recording frequency without band restriction. The maximum likelihood detecting circuit 56 discards a path shown in a thin line every time a path is defined to be a path shown in a thick like as shown in FIG. 10K and a path having a new possibility is stored so that an output code in FIG. 10L is output. If an error is made by noise or the like, the error is corrected as shown in A and B portions of FIGS. 11A to 11F decoder 58 provided subsequently to the maximum likelihood detecting circuit 56 reversely converts the reconstituted 1/7 RLL code reconstruct date as shown in FIG. 10M.

In the case in which a DC component becomes a problem, a scrambler circuit may be provided before the encoder 60 to make input data random and a descrambler circuit may be provided after the decoder 58 to return original data during reproduction. Moreover, while the maximum likelihood detecting circuit 56 has been described to have the three values, it can also be constituted by five values of +2, +1, 0, −1 and −2. Furthermore, while the VFO circuit 76 detects a clock from the output of the low-pass filter 72, the output of the narrow band equalizer 52 may be input to detect a clock.

Figure 12:
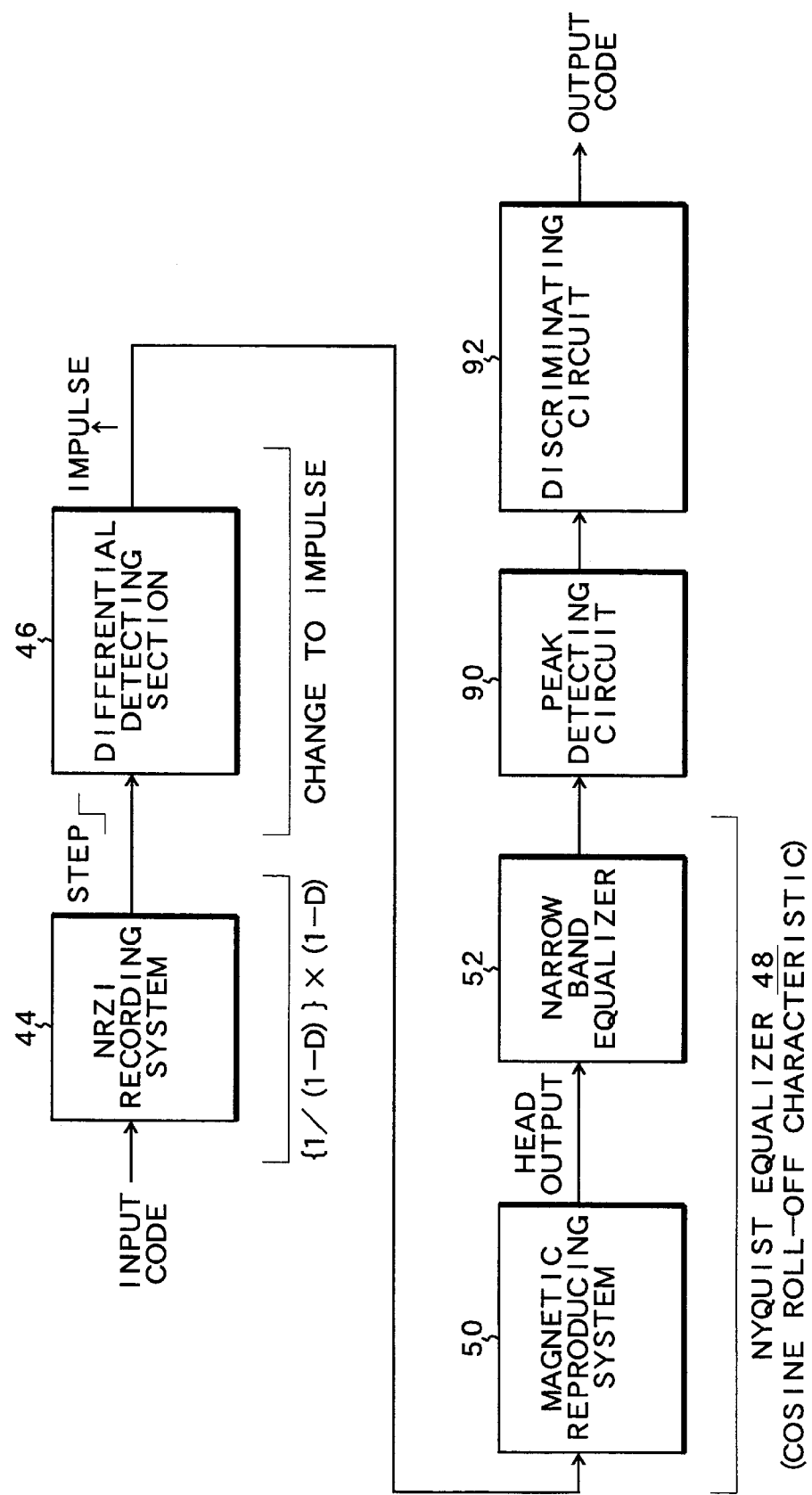
FIG. 12 is a block diagram showing a signal processing apparatus for carrying out peak detection through the (1–D) partial response system according to the present invention.

FIG. 12 shows the basic structure according to another embodiment of the narrow band (1−D) partial response signal processing apparatus in accordance with the present invention and is characterized in that a code is reconstituted by the peak detection of a partial response waveform. The narrow band (1−D) partial response signal processing apparatus shown in FIG. 12 is constituted by an NRZI recording system 44, a differential detecting section 46, a magnetic reproducing system 50, a narrow band equalizer 52, a peak detecting circuit 90 and a discriminating circuit 92. The NRZI recording system 44, the differential detecting section 46, the magnetic reproducing system 50 and the narrow band equalizer 52 are the same as those of the fourth embodiment. More specifically, an input code is recorded in a medium like a step through the NRZI recording system 44 and the result of the record of the medium is changed into an impulse by the detection of the differential detecting section 46 through the head. In this case, the change into an impulse can also be carried out by detecting the vertical component of a magnetic flux through an MR head. The magnetic reproducing system 50 reproduces, as a head output, the impulse response waveform of a transmission characteristic determined by the frequency characteristic of the medium and the head. A product of a transmission characteristic H1 of the magnetic reproducing system 50 and a transmission characteristic H2 of the narrow band equalizer 52 is set to be a transmission characteristic H0 of the Nyquist equalizer 48. The transmission characteristic H0 of the Nyquist equalizer 48 is set such that a cosine roll-off characteristic in which a Nyquist frequency fn to have a gain of ½ is ¼ of the maximum recording frequency of the input code ranges over the whole passband. In other words, as in the characteristic shown in the solid line 80 of FIG. 5, the roll-off of the Nyquist equalizer 48 is set to be a cosine waveform and is set to obtain a gain of 1 with a frequency of 0, a gain of ½ with the Nyquist frequency fn, and a gain of 0 with a frequency 2 fn. This is expressed in the above-mentioned equations (1) to (4).

Moreover, the impulse response waveform obtained from the Nyquist equalizer 48 has an amplitude of "0" with a time of ±nT and an amplitude of "2" with a time of 0 as shown in the solid line of FIG. 6. Furthermore, an amplitude of "1" is obtained with an intermediate time ±0.5T and an amplitude of "0" is obtained with a time of ±(0.5+n)T so that the Nyquist fn can be set to be ½ of that in the case in which there is no band restriction. A broken line indicates an impulse response waveform in the Nyquist equalizer in the case in which the Nyquist frequency without band restriction is set to be ½ of the maximum recording frequency. By comparing both of them, it is apparent that the present invention carries out the equalization with a great pulse width and a small amount of frequency components are therefore enough.

In the impulse response waveform according to the present invention, moreover, an amplitude of "1" with a time of ±0.5T becomes a problem which can be solved by the selection of a code. More specifically, the impulse response waveform to be alternately positive and negative is obtained by the NRZI recording system 44. Therefore, if there is at least one "0" between the waveforms, an interference with the amplitude of "2" can be removed. Thus, a partial response equalization waveform to have amplitudes of 2, 1, 0, −1 and −2 in a predetermined time is output to the output of the narrow band equalizer 52. A peak detecting circuit 90 peculiar to the embodiment of FIG. 12 detects a peak corresponding to an amplitude of ±2 of the partial response equalization waveform output from the narrow band equalizer 52. A discriminating circuit 92 outputs an output code corresponding to peak detection corresponding to the amplitude of ±2 by the peak detecting circuit 90.

Figure 13:
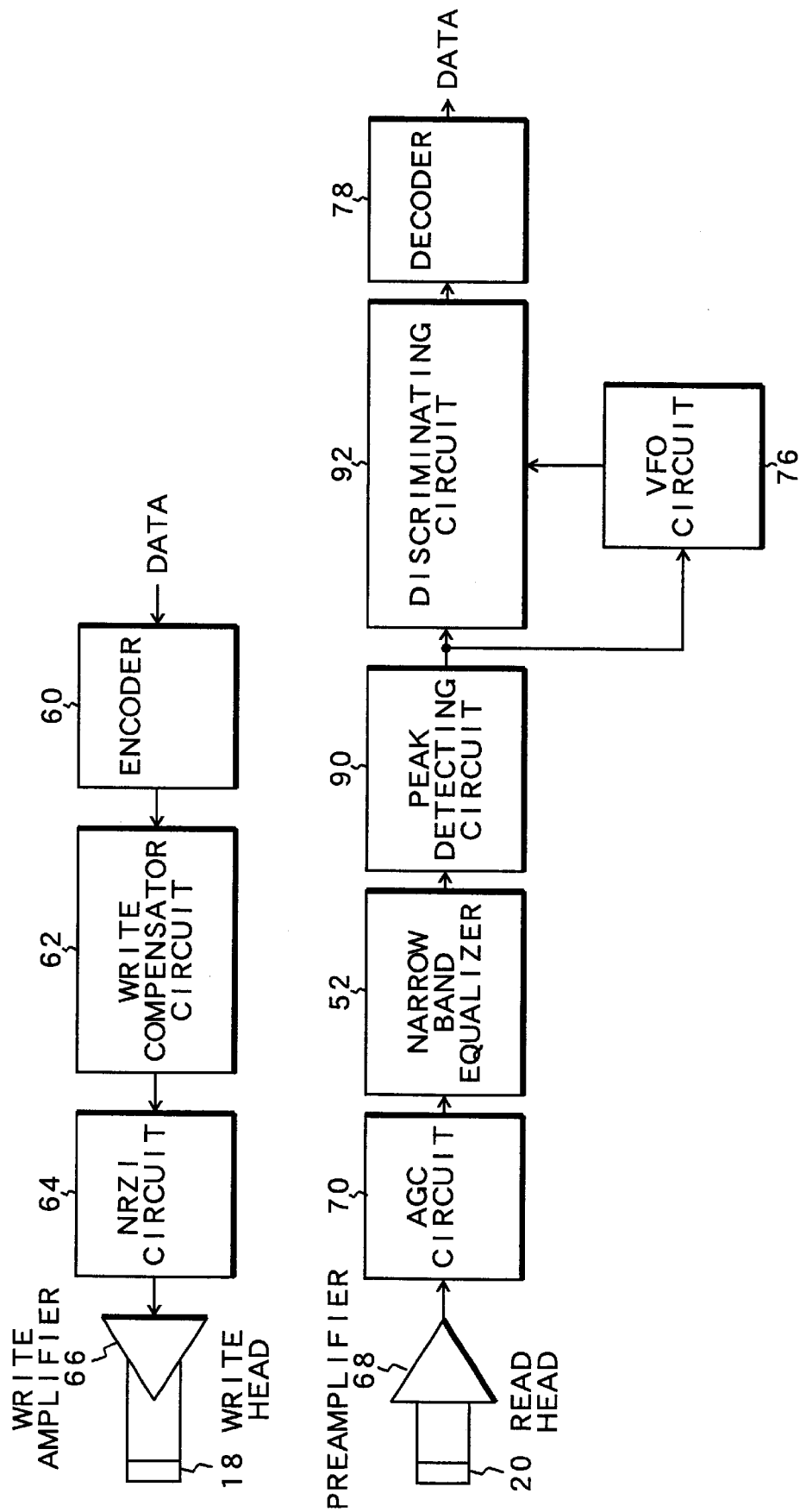
FIG. 13 is a block diagram showing the case in which the peak detection of the (1–D) partial response system according to the present invention is applied to the read channel unit of the hard disk drive in FIG. 3.

FIG. 13 is a block diagram according to a specific embodiment in the case in which the narrow band (1−D) partial response signal processing for carrying out the peak detection in FIG. 12 is applied to the hard disk drive in FIG. 3. In FIG. 13, a recording system is constituted by an encoder 60, a write compensation circuit 62, an NRZI circuit 64, a write amplifier 66 and a write head 18. Moreover, a reproducing system is constituted by a read head 20, a preamplifier 68, an AGC circuit 70, a narrow band equalizer 52, a peak detecting circuit 90, a discriminating circuit 92, a VFO circuit 76 and a decoder 78. The encoder 60 converts the input data into the 1/7 RLL code and the number of continuous codes "0"s is 1 at a minimum and 7 at a maximum. The write compensation circuit 62 previously moves a recording position slightly in order to compensate for a non-linear shift (NLTS). The compensation algorithm of the non-linear shift is carried out in accordance with the above-mentioned Table 1. More specifically, when a last bit (n−1) is 1, a current bit "n" is shifted (Late) backward by a time of τ. When the last bit (n−1) is a code of 0, the current bit is recorded in a normal position (Non). The compensation algorithm serves to compensate for a non-linear shift phenomenon (NLTS) in which next magnetized inversion is shifted forward by the influence of previous magnetized inversion by 1 bit. Moreover, in the case in which there is an influence of the previous magnetized inversion by 2 bits or more, it can also be compensated. In this case, a compensation amount Δ τ is sequentially reduced. Moreover, since the narrow band (1−D) partial response signal processing according to the present invention has a low recording frequency, it has a small amount of the non-linear shift (NLTS) and can also be omitted. The NRZI circuit 64 serves to convert an RZ code into an NRZI code and an operation of $\{1/(1-D)\}\cdot\{1-D\}$ is carried out equivalently. The write amplifier 66 drives the write head 18 to cause a recording current corresponding to the NRZI code to flow and carries out magnetic recording in a medium which is not shown. The read head 20 has a differential characteristic for detecting a change in magnetization of the medium. Consequently, data recorded in the medium like a step are differentiated to be an impulse. At the same time, the read head 20 has a transmission characteristic corresponding to the frequency characteristic of the medium and the characteristic has been known as the Lorentz approximation. The transmission characteristic of the head medium system is the same as that in FIG. 8. The AGC circuit 70 causes the amplitude of a reproducing waveform output from the preamplifier 68 to be constant. The narrow band equalizer 52 serves to equalize a transmission characteristic after the read head 20 into a cosine roll-off characteristic and is changed into a characteristic shown in a solid line 86 in FIG. 9. A characteristic H2 shown in the solid line 86 of FIG. 9 is set to be a transmission characteristic of H2=H0/H1 obtained by dividing a transmission characteristic H0 of the cosine roll-off characteristic in FIG. 5 by a transmission characteristic H1 of the head medium system in FIG. 8. As compared with a characteristic shown in a broken line 88 in which band restriction is not carried out, in the transmission characteristic H2 of the narrow band equalizer 52 shown in the solid line 86 of FIG. 9, the gain of a high frequency is reduced greatly. Although a frequency band has conventionally required 2 fn or more, 2 fn is enough. In consideration of the fact that a noise spectral generated from the medium by the reduction in the band is great with a high frequency, S/N can be enhanced greatly. The narrow band equalizer 52 is constituted by an electric filter or a transversal filter and can also be of an adaptive type for automatic regulation according to a reproducing signal. The narrow band equalizer 52 using the electric filter regulates and optimizes a cut-off frequency fc and a boost fb. Moreover, in the case in which the transversal filter is used, a tap coefficient is set to be of an application type for automatically regulating a tap coefficient in response to a reproducing signal. The peak detecting circuit 90 can use a differential zero intersection detecting circuit, for example. The differential zero intersection detecting circuit detects a peak position, detects a signal having an amplitude of a predetermined value or more through an amplitude detecting circuit and detects a peak based on their AND. The VFO circuit 76 serves to generate a clock signal synchronously with the reproducing signal and is constituted by a PLL circuit for generating a clock signal synchronously with the leading edge of a peak detection pulse. The discriminating circuit 92 discriminates the result of the peak detection through a window corresponding to one cycle of a clock sent from the VFO circuit 76 and outputs the output code of a pulse synchronous with the clock. The decoder 78 converts a 1/7 RLL code reconstituted by the peak detecting circuit 90 into original data to be output as demodulation data.

The embodiment of FIG. 13 will be described in more detail with reference to time charts of FIGS. 14A to 14J. FIG. 14 shows input data which are converted into a 3-bit 1/7 RLL code every two bits. An operation of 1/(1−D) is equivalent to an exclusive OR of the input code in FIG. 14B and last data of the result of the operation of 1/(1−D). Moreover, (1−D) is equivalent to an operation of 1/(1−D) with one delay. The operations of 1/(1−D) and (1−D) are equivalently executed in one flip-flop stage of the NRZI circuit 64. The write amplifier 66 drives the write head 18 such that the direction of a recording current flowing from the write amplifier 66 to the write head 18 is inverted with codes 1 and −1 as shown in FIG. 14C. A code recorded magnetically in the medium is changed into an impulse by the differential detecting function of the read head 20 and an impulse response waveform shown in FIG. 14E is output from the head based on the transmission characteristic of the medium/head. The read head 20 is an inductive head and can similarly carry out the differential detection of the result of record of the medium by detecting the vertical component of a magnetic flux through an MR head. The narrow band equalizer 52 is constituted by an electric filter or an FIR filter, for example, and is set to have such a transmission characteristic as to be obtained by the Nyquist equalizer. In the case of the FIR filter, for example, the narrow band equalizer 52 is constituted by a 10-tap transversal filter, and furthermore, can be of an application type. The narrow band equalizer 52 of the application type corrects each tap gain according to a shift of a voltage on the sample point of an equalizer output waveform shown in a solid line of FIG. 14F from each of five values of ±2, ±1 and 0 and repeats this operation so that a desired transmission characteristic can be set. A broken line indicates a waveform obtained when band restriction is not carried out. As a result, the transmission characteristic after the read head 20 is the cosine roll-off characteristic and the sample point is set to +2, +1, 0, −1 and −2 like a dot so that a Nyquist equalized partial response can be obtained and an interference waveform can be removed in positions from a peak point by ±2. More specifically, as shown in FIG. 14G, the peak point of the amplitude 2 in the equalizer output waveform is detected, a code is reconstituted by the discrimination of the discriminating circuit 92 in FIG. 14H, an output code in FIG. 14I is finally generated by the decoder 78, and data shown in FIG. 14J are reconstituted by the decoder 78 which are the same as the input code shown in FIG. 14B.

While the complex head comprising the write head and the read head separately has been described in the embodiments, it is also possible to use a single head such as an inductive head capable of carrying out write and read at the same time.

Although the 1/7 RLL code has been described as a code in the embodiments, the present invention can also be implemented with other codes reducing a recording frequency such as a 2/7 RLL code. Furthermore, the present invention includes all modifications which do not damage the objects and advantages, and furthermore, is not restricted to the numeric values shown in the embodiments.

INDUSTRIAL APPLICABILITY

As described above, according to the narrow band (1−D) partial response signal processing in accordance with the present invention using the maximum likelihood detection, a code string obtained by carrying out a (1−D) waveform processing on an input code through a recording system can have a low S/N by setting a Nyquist band in which ¼ of a maximum frequency determined by a code is set to be a Nyquist frequency fn, a recording density can be enhanced greatly, and furthermore, the distortion of a recording current waveform can be lessened so that the maximum likelihood detection can be implemented with a small non-linear shift (NLTS) at a comparatively low recording frequency.

In the narrow band (1−D) partial response signal processing based on the peak detection according to the present invention, moreover, the S/N can be more reduced and the recording density can be enhanced considerably in the same manner as in the maximum likelihood detection. Moreover, since the distortion of the recording current waveform is small, it is possible to enhance the recording density with a small non-linear shift (NLTS) at a comparatively low recording frequency.

Furthermore, the write compensation algorithm of the recording system in the narrow band (1−D) partial response signal processing according to the present invention is simply changed from a pattern effect compensation type in a signal processing through the conventional peak detection into a non-linear distortion (NLTS) type and a circuit structure is less changed. Moreover, in the case in which the amount of the compensation through the write compensation circuit is small or nothing, reproduction can be carried out at a low error rate with high reliability by the narrow band (1−D) partial response signal processing according to the present invention through the peak detection.

What is claimed is:

1. A signal processing apparatus for carrying out a signal processing for a partial response system comprising:

a code processing means for carrying out a (1−D) waveform processing for an input code; and Nyquist equalizing means for equalizing a code string obtained by the waveform processing of the code processing unit by setting ¼ of a maximum frequency determined by the code to be a Nyquist frequency.

2. The apparatus according to claim 1, further comprising a maximum likelihood detecting section for carrying out maximum likelihood detection for the code string which is Nyquist equalized by the equalizing means.

3. The apparatus according to claim 2, wherein the maximum likelihood detecting section carries out maximum likelihood detection based on three values of a Nyquist equalization waveform.

4. The apparatus according to claim 1, further comprising a peak detecting section for carrying out peak detection for the code string which is Nyquist equalized by the equalizing means.

5. A signal processing method of carrying out a signal processing for a partial response system, comprising:

a code processing step of carrying out a (1−D) waveform processing for an input code; and an equalizing step of Nyquist equalizing the code string obtained by the waveform processing of the code processing section by setting ¼ of a maximum frequency determined by the code to be a Nyquist frequency.

6. The method according to claim 5, further comprising a maximum likelihood detecting step of carrying out maximum likelihood detection for the code string which is Nyquist equalized at the equalizing step.

7. The method according to claim 6, wherein the maximum likelihood detecting step carries out maximum likelihood detection based on three values of a Nyquist equalization waveform.

8. The method according to claim 5, further comprising a peak detecting step of carrying out peak detection for the code string which is Nyquist equalized at the equalizing step.

9. An information storage apparatus for carrying out a signal processing for a partial response system through a recording medium, comprising:

a recording means for converting an RZ input code into an NRZI code and recording the NRZI code in the recording medium through a write head, thereby giving a (1−D) waveform processing to the RZ input code; and an equalizing means for Nyquist equalizing a reproduction code reproduced from the recording medium through a read head based on an equalizing transmission characteristic obtained by dividing a cosine roll-off characteristic setting ¼ of a maximum frequency determined by the RZ input code to be a Nyquist frequency by a transmission characteristic of a magnetic recording and reproducing system.

* * * * *